May 7, 1974  V. MONIA  3,809,602
SARAN ADHERED TO BUTADIENE-STYRENE POLYMERS
Original Filed April 1, 1969  2 Sheets-Sheet 2
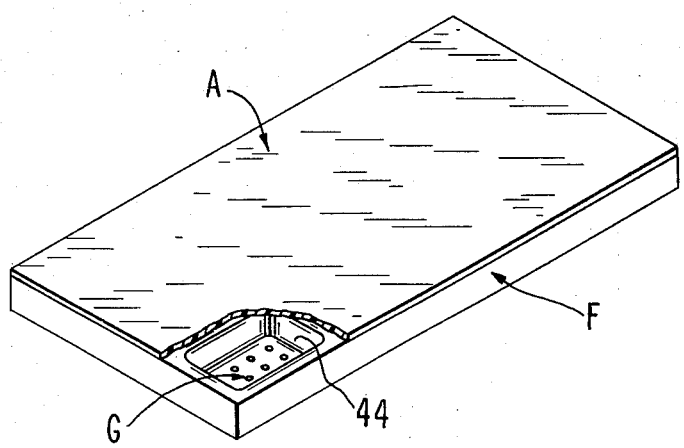
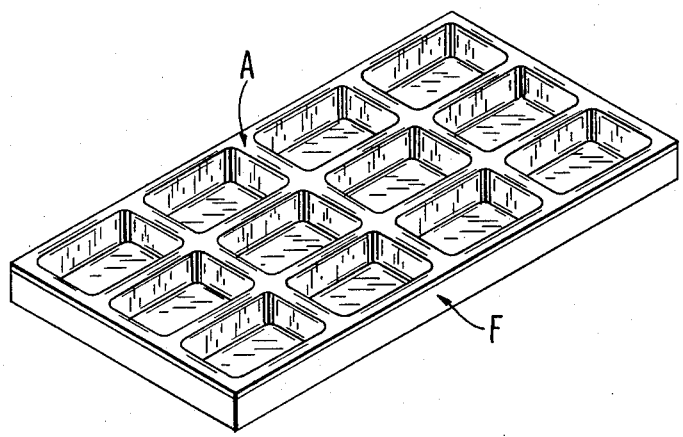
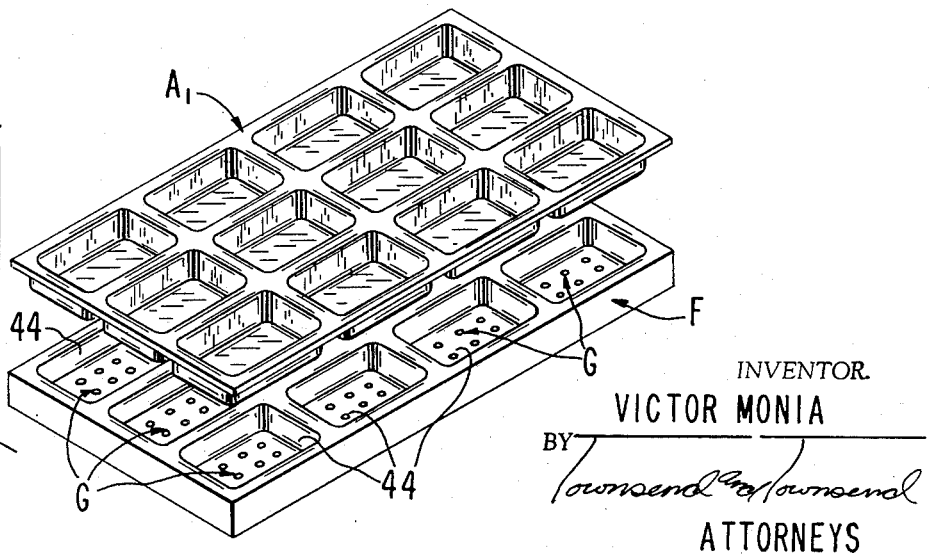
INVENTOR.
VICTOR MONIA
BY
Townsend and Townsend
ATTORNEYS United States Patent Office 3,809,602
Patented May 7, 1974

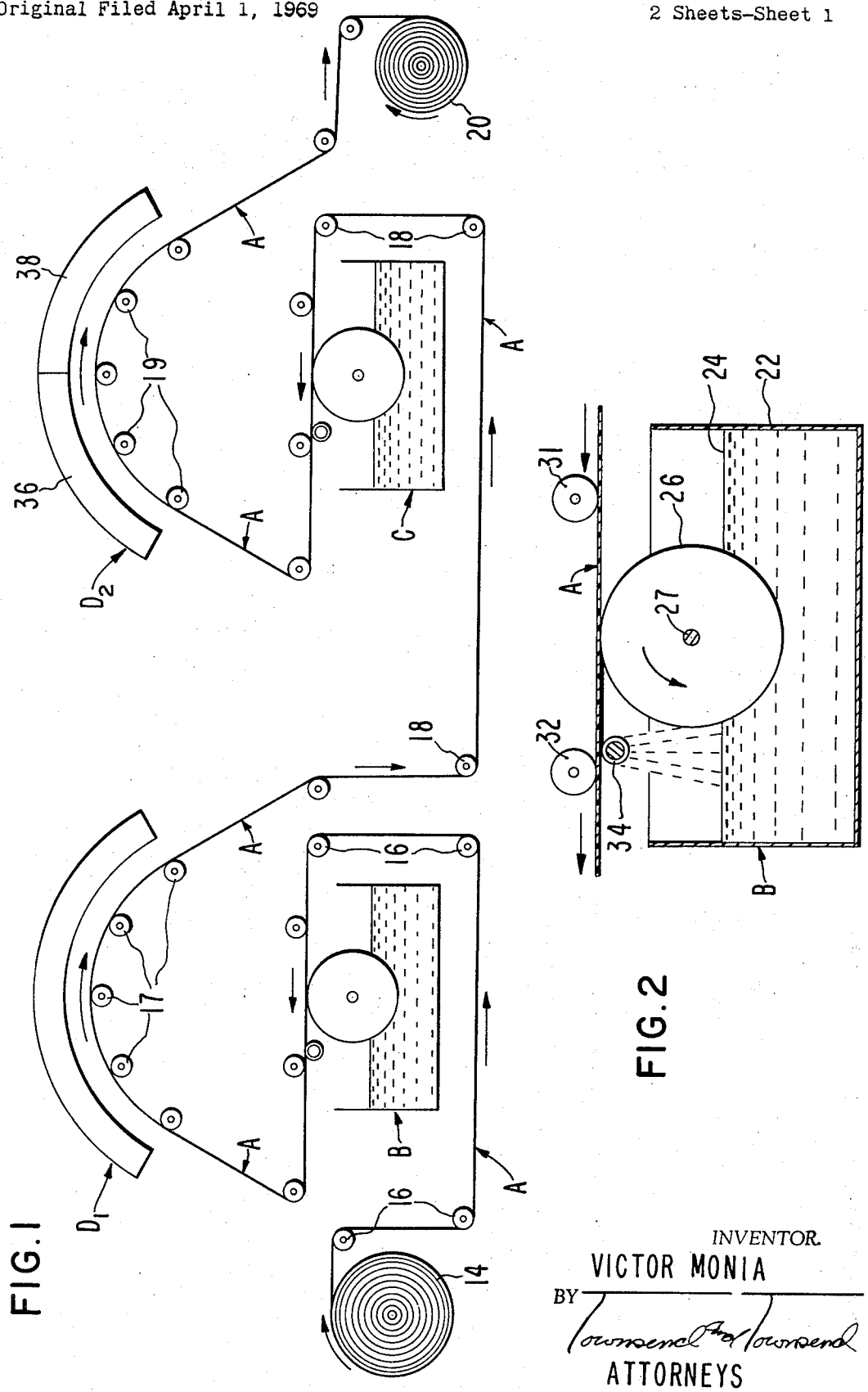

3,809,602
SARAN ADHERED TO BUTADIENE-
STYRENE POLYMERS
Victor Monia, Mountain View, Calif., assignor to
Guardian Packaging Corporation, Newark, Calif.
Continuation of abandoned application Ser. No. 812,238,
Apr. 1, 1969. This application Sept. 8, 1971, Ser. No.
178,814
Int. Cl. B32b 27/08
U.S. Cl. 161—165
7 Claims

ABSTRACT OF THE DISCLOSURE

A strip of acrylonitrile-butadiene-styrene terpolymer or butadiene styrene copolymer is laminated with a coating of a vinyl chloride-vinylidene chloride copolymer. This lamination is a semi-rigid, flexible packaging material which can be readily drawn in a mold to form a food containing package. The package can be filled with food product at relatively high temperature, and provides, when sealed, a food preserving package of long shelf life.

This is a continuation of application Ser. No. 812,238, filed Apr. 1, 1969, and now abandoned.

This invention relates to a semi-rigid flexible package having barrier characteristics in which a strip or substrate of either acrylonitrile-butadiene-styrene terpolymer, or butadiene-styrene copolymer is laminated with a coating of Saran, which is a name used in the trade to refer to polyvinylidene chloride and copolymers of vinylidene chloride with minor amounts of one or more aliphatic compounds, primarily mono-olefinic monomers such as alkyl acrylates, acrylonitrile methacrylonitrile, vinyl chloride and vinyl acetate, copolymerizable therewith; and then drawn to form a food container.

Semi-rigid flexible packages are known. Typically a semi-rigid packaging material is drawn under vacuum or pressure or other mechanical methods to form a container in which a food product is later placed. The container, when filled, is sealed and forms a disposable package which can be discarded when the contained food is consumed. Semi-rigid flexible packages having barrier properties to prevent both the escape of moisture from packaged food and the penetration of spoiling oxygen into the food are known. Heretofore, such packages have been fabricated from materials including one or more laminates of semi-rigid vinyl and other plastics of varying barrier properties.

Semi-rigid vinyl is a material having some barrier properties. This vinyl, while capable of being drawn to form a package, suffers serious disadvantages. These disadvantages include the fact that the vinyl is expensive and can only be drawn at relatively slow rates. Moreover, when vinyl is drawn to form semi-rigid flexible packages, it commonly must be retained in, or "dwell" within a heated ambient for a relatively long interval of time, or the material will elastically return or memory back, wholly or partially, to its original preformed disposition. Finally, vinyl packages can only be filled with food product at relatively low temperatures in the range of 170° F., as temperatures in excess of this limit cause the filled package to deform.

Attempts to remedy these deficiencies of vinyl have been made. These attempts have included fabricating laminates of vinyl with intermediate layers of Saran and exterior layers of polyethylene. The resultant packaging material, however, having improved flexibility and barrier characteristics, still maintains many of the basic deficiencies of vinyl. These deficiencies include the expense of vinyl, the relatively slow rates at which vinyl can be drawn and the relatively low temperature at which the food product can be placed into the container without the formed package becoming deformed.

An object of this invention is to set forth an inexpensive, flexible and semi-rigid package laminate which can be drawn into a food containing package having improved barrier properties. Accordingly, a strip or substrate of acrylonitrile-butadiene-styrene terpolymer or butadiene-styrene copolymer has Saran laminated thereto. The strip imparts rigidity to the formed package while the Saran layer produces a barrier providing improved shelf life of the package when formed.

An advantage of this invention is that the material cost of the laminate is less than 40% of its vinyl prior art equivalent.

A further object of this invention is to provide a package laminate which can be rapidly drawn without excessive dwell in a heated ambient. The total time necessary to form a food containing package can be up to 30% less than that necessary for the forming of vinyl laminates.

A still further object of this invention is to provide a package having an inside Saran coating or lamination which gives improved shelf life to packaged products by preventing water loss, oxygen penetration, and grease and oil loss through the package wall.

An advantage of the package of this invention is that it can be filled with food product at temperatures in the range of 190° F. without the danger of package deformation. Further it has been found, that food product contained within the package can be cooked to temperatures approaching the range of 190° F. without package deformation, a result not possible with vinyl laminated packages.

Other objects, features and advantages of the present invention will become apparent as the following specification progresses, reference being had to the accompanying drawing for a preferred embodiment of the invention.

In the drawing:

FIG. 1 is a schematic diagram illustrating the process by which the laminate of this invention is formed;

FIG. 2 is a diagram of the coating station for applying the layers of adhesive and Saran, respectively;

FIG. 3 is a schematic diagram illustrating the laminated material of this invention prior to forming;

FIG. 4 is a schematic diagram of laminated material during forming; and

FIG. 5 is a schematic diagram of the laminated material after forming.

With reference to FIGS. 1 and 2, a schematic illustration of the disclosed process for forming the laminated strip is illustrated. An advancing strip A is shown being fed with a convolute roll 14. The strip winds under idler rolls 16 and passes through a first coating station B which applies a layer of adhesive. After receiving the adhesive, the strip advances through idler rollers 17, through an oven D1 which drys the adhesive on the strip. After passing through the oven D1, the advancing strip is fed through idler rolls 18 to a second coating station C where a coating of Saran is applied. The laminate then passes through idler rolls 19 and through an oven D2 which dries the Saran on the adhesive. The laminated strip A is finally wound in a convolute roll about a rewind core 20.

With reference to FIGS. 3–5, the fabrication of a semi-rigid flexible package from the Saran laminated styrene is illustrated. The laminated strip A is passed directly over a mold F with the Saran laminate facing away from the mold surface. Mold F has concavities conforming to the outside dimension of the formed container. The strip is placed on the mold F and heated to a temperature in the range of approximately 300–350° F. and drawn under pressure (here shown as a vacuum) interior of the female concavities of the mold. The vacuum drawn through holes G in mold F, pulls the laminated strip A down and into the molding surfaces when the temperature of the strip exceeds its thermoplastic state and rapidly imparts concavities to the strip. When the strip is separated from the mold by release of the vacuum, it has the concavities formed therein. These concavities can subsequently be filled with food, sealed and distributed in a package which provides the contained food product with a long shelf life.

Commonly, the strip is either a acrylonitrile-butadiene-styrene terpolymer or butadiene styrene copolymer. The strip has a thickness in the range of 0.006 inch to 0.060 inch, a thickness of 0.012 to 0.025 inch being preferred. This base film can be of any selected color from a natural translucent and frosted tinge to colors such as red, yellow, white, green and the like.

A suitable adhesive applied at first coating station B is usually applied in an even and uniform coating in the range of 0.1 to 3 dry pounds per ream (approximately 3,000 square feet) of passing strip A, a coating of 2 dry pounds per ream being preferred.

Several primers or adhesives are known which can be used to effect the desired adhesion between the acrylonitrile-butadiene-styrene copolymer or butadiene-styrene polymer and the Saran. An adhesive sold under the trademark Hermetite H1037, a product of the Hermetite Adhesive Company is one such product. Hermetite H1037 is essentially a mixture, on a one hundred percent (100%) solids basis, of about sixty-eight percent (68%) by weight of acryloid resin including methyl acrylate and methyl alkyl acrylates, with alkyl denoting the groups ethyl, propyl and butyl, such methyl alkyl acrylates being commercially available and sold under the trade name Acryloid B–66 by the Rohm & Haas Company; about ten percent (10%) of FDA approved glycolate; and about twenty-two percent (22%) of a terpolymer of vinyl chloride, vinyl acetate, and interpolymerized di-basic acid; all suspended in a liquid solvent vehicle comprising principally methyl ethyl ketone. Additionally, an adhesive sold under the trade name Accobond 1094, a product of the American Cynamid Company has been found sufficient to effect the desired bonding and solvent release properties necessary for use with this invention.

It is essential that an adhesive be chosen which has a solvent which will not emanate from the finally produced laminate when it is formed into a food containing package. If the solvent of the adhesive is not completely dried and removed from the laminated strip A, it will evaporate into the formed food containing package imparting an undesired taste and conceivably could be injurious when consumed with the food.

Typically, the Saran coating is applied at second coating station C so as to be in a concentration in the range of 2 pounds to 25 pounds as dried per ream of strip A, a coating of 5 pounds per ream being preferred. This Saran is typically a water emulsion in which the water diluent comprises approximately 50% by weight of the liquid mixture. Alternatively, lacquer solutions of Saran can be used. The Saran imparts to the pervious strip a barrier laminate which typically arrests the passage of moisture out of the contained food product and prevents the penetration of spoiling oxygen through the formed package into the contained food product.

Coating stations B and C are similar in that they both apply laminates to the passing strip A in liquid form. Coating station B illustrated in FIG. 2 is sufficient to describe both functions. Typically, the coating station comprises a container 22 for confining a bath 24 of either adhesive (as in the case of FIG. 2) or Saran (as in the case of station C). An applicator roller 26 is rotatably mounted about an axis 27 relative to the bath 24 so that the lower portion of the applicator roller is immersed and the upper portion of the applicator roller contacts the passing web. Typically the applicator roller is rotated so as to parallel at its upward surface the movement of the passing strip A and transport the liquid from bath 24 to strip A to apply a coating thereto.

Strip A, shown passing from right to left across coating station C in FIG. 2, passes over first tension roller 31. Thereafter strip A passes into contact with the outside surface of applicator roll 26 where the coating, here shown as adhesive, is applied by applicator roller 26. Web A then is contacted between a second idler roller 32 on the noncoated side and a metering rod 34 on the coated side. Metering rod 34, a standard item of manufacture, functions to remove the excess coated material from the passing strip A leaving only a uniform coating of the desired thickness thereon.

After passing through adhesive coating station B, the path defined by idler 17. The strip A is reversed in its path so that idler rollers 17 contact the uncoated side of the strip and the freshly coated adhesive is exposed to the oven D1.

Oven D1, commonly of a length in the range of 12'–14' is heated to a temperature of approximately 300° F. This element, having an arcuate shape complementary to the arcuate path of the web thereunder exposes its heated surface approximately 1" from the passing web. The web, advancing at a speed range between 150' and 175' per minute is dried so as to remove substantially all of the solvent contained in the liquid adhesive coating from the adhesive coating. The adhesive when exiting oven element D1 on strip A is a flexible and solid laminate.

After passing through oven D1, the web is then guided by idler rollers 18 to coating station C. At station C the web receives its desired uniform coating of Saran. After receiving its coating of Saran, the web passes upwardly to idler rolls 19 again tracing an arcurate path under an oven D2.

Oven D2 is a 22' long heater apparatus divided into two 11' sections 36 and 38. First section 36, spaced above the passing web at an interval of approximately 1" is heated to a temperature of approximately 400°. Second section 38, spaced a similar interval above the passing web is heated to a temperature of 340°. The reduction in temperature between first stage 36 and second stage 38 affects on the passing and drying Saran lamination a gradual reduction in temperature so that when the finally processed web is wound and received about rewind core E, no sticking or blocking of the Saran occurs.

It will be noted that virtually any apparatus for coating strip A with either the adhesive or Saran solution is sufficient in the practice of this invention.

Typically, once the laminated packaging material is manufactured, it is transported in a convolute wind to the location where the packages are subsequently formed. Such formation is illustrated in FIGS. 3, 4 and 5.

As a first step in package formation, the laminated strip A is typically removed from its convolute wind and placed in a plannar disposition by apparatus not shown. Typically, the web is advanced in uniformed increments coextensive with an overlying of mold F.

Mold F as shown in FIGS. 3–5 has a heated body maintained at a temperature in the range of 300–350° F. (by apparatus not shown). The mold includes a plurality of concavities 44 which concavities have an inside dimension equal to the desired outside bottom dimension of the finished container. As shown in the illustrated FIGS. 4 and 5, the concavities 44 are typically orientated in longitudinal columns with transverse rows so that a plurality of containers (here shown being 12 in number) can be formed simultaneously.

Concavities 44 of mold F are each given a depth and width so that strip A will not be drawn beyond a point where the Saran maintains its continuity and is not ruptured. A draw ratio area to area in the range of two to one is preferred. Drawing beyond this limit can cause loss of barrier in the formed package.

Extending between the bottom surface 46 of each mold and connected to suction apparatus (not shown)

there are a plurality of holes G. Holes G function to draw a vacuum on strip A so as to deform those portions of the strip overlying concavities 44 downwardly into the mold for forming containers.

Strip A, as shown in FIG. 3, is first placed in overlying relation to mold F, where heat is imparted to the strip by conventional apparatus not shown. Sufficient heat is applied to raise the temperature of the strip beyond its thermoplastic point. As shown in FIG. 4, a vacuum is drawn through holes G in the bottom of the mold. This vacuum causes the heated laminant to be pulled downwardly into the mold so that the desired food containing concavities are formed in strip A. As can be seen from the drawing, each concavity provides, in effect, a molded generally cup-shaped packaging article for foods. When the vacuum is released, the formed strip is removed as shown in FIG. 5.

In the forming of the food containing packaging, pressure (herein shown as a vacuum) is applied to the mold for a period of time just long enough to cause the food concavity to be formed. Once the concavity is formed, the pressure is released, and the strip removed from the mold with the concavities permanently formed therein.

The vacuum forming herein illustrated is exemplary only. Virtually any known type of forming can be used. Such forming methods can include forming with either heated or non-heated molds, drape forming or other known methods of producing the desired concavities.

Utility of the joined food containing packages is believed apparent. Typically, the formed packages are moved to another station (not shown) where they are filled with product, and to a third station where they are remotely sealed (also not shown).

Many processes of forming include the step of filling the formed package within the mold. It will be understood that this disclosure is intended to cover such simultaneous forming steps.

In the formation of the molded package it is essential that the Saran laminate on the formed package be on the inside and exposed to the contained food. If the laminate is on the outside of the package, physical abrasion can cause removal of portions of the Saran. When such portions are removed, the pervious strip is exposed and the shelf life characteristic of the packaged food product destroyed.

What is claimed is:

1. A flexible semi-rigid laminated packaging material, comprising a first lamination of material of one of the class of acrylonitrile-butadiene-styrene terpolymer and butadiene-styrene copolymer; said lamination being of a thickness of 0.006 inch to 0.060 inch; a second lamination of Saran and a third laminate of adhesive bonding said first and second laminates together, with said adhesive being obtained by depositing onto said first laminate a mixture of about 68% by weight of acryloid resins, about 10% glycolate and about 22% of a terpolymer of vinyl chloride, vinyl acetate, and interpolymerized di-basic acid suspended at the time of deposition in a liquid solvent vehicle.

2. The packaging material of claim 1 wherein: said first lamination has a thickness of 0.012 to 0.025 inch; and said second lamination has a thickness consonant with its weight being in the range of 2 to 25 pounds per ream of said first lamination.

3. A molded generally cup-shaped packaging article for holding spoilable eatables and being formed from a flexible semi-rigid laminated packaging material comprising: a first lamination of material of one of the class of acrylonitrile-butadiene-styrene terpolymer and butadiene-styrene copolymer; said lamination being of a thickness of 0.006 inch to 0.060 inch; a second lamination of Saran and a third laminate of adhesive between said first and second laminations for bonding all of said laminations together.

4. The article of claim 2 wherein said first lamination has a thickness of 0.012 to 0.025 inch, and said second lamination has a thickness consonant with its weight being in the range of 2 to 25 pounds per ream of said first lamination.

5. The article of claim 2 wherein said first lamination is on the outside exposed surface of and said second lamination is on the inside exposed surface of the cup-shaped article.

6. The article of claim 3 wherein said first lamination is an acrylonitrile-butadiene-styrene terpolymer; and said adhesive is a deposited mixture of about 68% by weight of acryloid resins, about 10% glycolate and about 22% of a terpolymer of vinyl chloride, vinyl acetate, and terpolymerized di-basic acid suspended at the time of deposition in a liquid solvent vehicle.

7. The article of claim 3 wherein said first lamination is a butadiene-styrene copolymer; and said adhesive is a deposited mixture of about 68% by weight of acryloid resins, about 10% glycolate and about 22% of a terpolymer of vinyl chloride, vinyl acetate, and interpolymerized di-basic acid suspended at the time of deposition in a liquid solvent vehicle.

References Cited
UNITED STATES PATENTS

| | | | |
|---|---|---|---|
| 3,328,196 | 6/1967 | Sincock | 117—76 |
| 3,458,392 | 7/1969 | Kremer et al. | 161—254 |
| 2,990,306 | 6/1961 | Dyer | 161—165 |
| 3,354,238 | 11/1967 | Schmitt et al. | 260—880 R |
| 3,387,988 | 6/1968 | De Lapp et al. | 117—138.8 |
| 2,824,024 | 2/1958 | Chapman | 117—76 |
| 3,222,211 | 12/1965 | Updegrove et al. | 117—76 |

WILLIAM J. VAN BALEN, Primary Examiner

U.S. Cl. X.R.

161—253, 254

UNITED STATES PATENT AND TRADEMARK OFFICE
Certificate

Patent No. 3,809,602　　　　　　　　　　　　　　Patented May 7, 1974

Victor Monia

Application having been made by Victor Monia, the inventor named in the patent above identified and Guardian Packaging Corporation, Newark, California, the assignee, for the issuance of a certificate under the provisions of Title 35, Section 256, of the United States Code, adding the name of Louis J. Marsella as a joint inventor, and a showing and proof of facts satisfying the requirements of the said section having been submitted, it is this 1st day of April 1975, certified that the name of the said Louis J. Marsella is hereby added to the said patent as a joint inventor with the said Victor Monia.

FRED W. SHERLING,
*Associate Solicitor.*